United States Patent [19]

Piatt

[11] Patent Number: 4,866,461

[45] Date of Patent: Sep. 12, 1989

[54] THERMAL, DROP-ON-DEMAND, INK JET PRINT CARTRIDGE

[75] Inventor: Michael J. Piatt, Enon, Ohio

[73] Assignee: Eastman Kodak Company, Rochester, N.Y.

[21] Appl. No.: 194,701

[22] Filed: May 17, 1988

[51] Int. Cl.[4] .......... G01D 15/16; B41J 3/04

[52] U.S. Cl. .......... 346/140 R

[58] Field of Search .......... 346/140, 76 PH

[56] References Cited

U.S. PATENT DOCUMENTS

| | | | |
|---|---|---|---|
| 3,478,191 | 11/1969 | Johnson | 346/76 PH X |
| 4,345,262 | 8/1982 | Shirato | 346/140 |
| 4,399,348 | 8/1983 | Bakewell | 346/76 PH X |
| 4,500,895 | 2/1985 | Buck | 346/140 |
| 4,712,172 | 12/1987 | Kiyohara | 346/140 X |
| 4,734,717 | 3/1988 | Rayfield | 346/140 |

FOREIGN PATENT DOCUMENTS 208249 10/1985 Japan .

*Primary Examiner*—Joseph W. Hartary
*Attorney, Agent, or Firm*—John D. Husser

[57] ABSTRACT

A thermal drop-on-demand print cartridge includes a base member, with an ink ingress opening and a heater slit, and a cover member that is mounted on the base member to define an ink supply channel from the ingress opening to the heater slit and an orifice array aligned with the heater slit. An ink reservoir is coupled to the base member for providing ink into the ingress opening and a heater and an electrode chip is mounted in the heater slit. The heater/electrode chip has a plurality of planar resistor elements formed on the chip edge that extends through the heater slit and electrodes are formed on chip sides that extend normally away from the resistor elements.

1 Claim, 5 Drawing Sheets

THERMAL, DROP-ON-DEMAND, INK JET PRINT CARTRIDGE

FIELD OF THE INVENTION

The present invention relates to ink jet printers of the thermal, drop on demand type and more particularly to improved constructions for the ink drop generator, or print head, portions of such printers.

Background Art

Thermal, drop on demand, ink jet printing is a class of ink jet printing that includes a variety of structural approaches, wherein ink droplets are generated "on demand" by discrete thermal energy pulses. The thermal pulses are selectively applied to volumes of ink at locations proximate discharge orifices to effect selective "bubble jetting" of ink droplets from orifices whose related heater elements are energized. That is, ink composition and ink heating are designed to form a vapor bubble in ink proximate the heater and such bubble formation jets a drop of ink from the related orifice.

For discussion purposes, the drop generator configurations used in thermal, drop on demand printing can be divided into: (i) "side shooter" varieties (see, e.g., U.S. Pat. No. 4,243,994) wherein the heater element is located generally parallel to, and upstream along an ink supply passage from, the orifice axis and (ii) "top shooter" varieties (see, e.g., U.S. Pat. No. 4,330,787) wherein the heater element is located normal to, and directly beneath, the orifice axis. The top shooter approach of heater/orifice disposition has been found to offer efficiency in drop ejection.

In both the side shooter and top shooter print head varieties, the predominate approach for forming electrodes to the resistance heater elements has been to deposit electrode material patterns on a dielectric substrate that also (i) supports the heater elements and (ii) defines a wall of the ink supply passage. This fabrication approach is simple, but it presents several difficulties. First, the electrodes must be insulated and protected from the ink. Second, coupling such electrode terminals to the printer's driver circuitry can present a problem because the electrodes are in the same plane as the heater. This is particularly troublesome in top shooter embodiments wherein the electrode plane is close to the print media plane. That is, the drop ejection orifice should be located close to the print media and, since the electrode plane is close to the orifice plane, it is very difficult to interpose printer couplings to the electrodes.

U.S. Pat. No. 4,635,073 shows one way to solve above noted electrode connection problem. In that fabrication, a tape automated bond (TAB) electrode circuit extends in the plane of the resistors to the boundaries of the ink passages and then extends downwardly away from the orifice plate. This allows coupling of the electrodes without impeding orifice/print media proximity. However, fabrication of a print head according to the '073 patent approach is complex; and substantial portions of the electrodes still remain exposed to ink, unless protected.

SUMMARY OF THE INVENTION

One significant purpose of the present invention is to provide improved constructions and fabrication techniques for thermal drop on demand ink jet print heads of the top shooter variety. One advantage of constructions according to the present invention is that the need for dielectric coatings over the electrodes is substantially eliminated. Another advantage of these inventive constructions is that the electrodes extend generally normally away from the plane of the print head resistor elements and, thus, from the orifice array. Therefore electrode terminal connections can be accomplished away from the print media plane.

Another advantage of the invention is that the main support substrate for the print head, which defines part of the ink flow channel(s), can be formed of a plastic material rather than of glass. This greatly simplifies manufacturing, e.g. the forming of the channel and baffle construction and the attachment of the orifice plate to the substrate.

In one aspect the present invention constitutes a thermal drop-on-demand print cartridge comprising a base member having an ink ingress opening and a heater slit spaced therefrom; a cover member constructed and mounted on the base member to define: (i) a plurality of ink supply channels that extend from the ingress opening to the heater slit and (ii) an orifice array aligned with the heater slit; an ink reservoir coupled to the base member for providing ink into the ingress opening and a heater and an electrode chip mounted in the heater slit and having: (i) a plurality of planar resistor elements formed on the chip edge that extends through the heater slit and (ii) electrodes formed on the chip face surfaces that are normal to the resistor elements.

BRIEF DESCRIPTION OF THE DRAWINGS

The subsequent description of preferred embodiments refers to theattached drawings wherein.

DETAILED DESCRIPTION OF THE PREFERRED EMBODIMENTS

Figure 1:
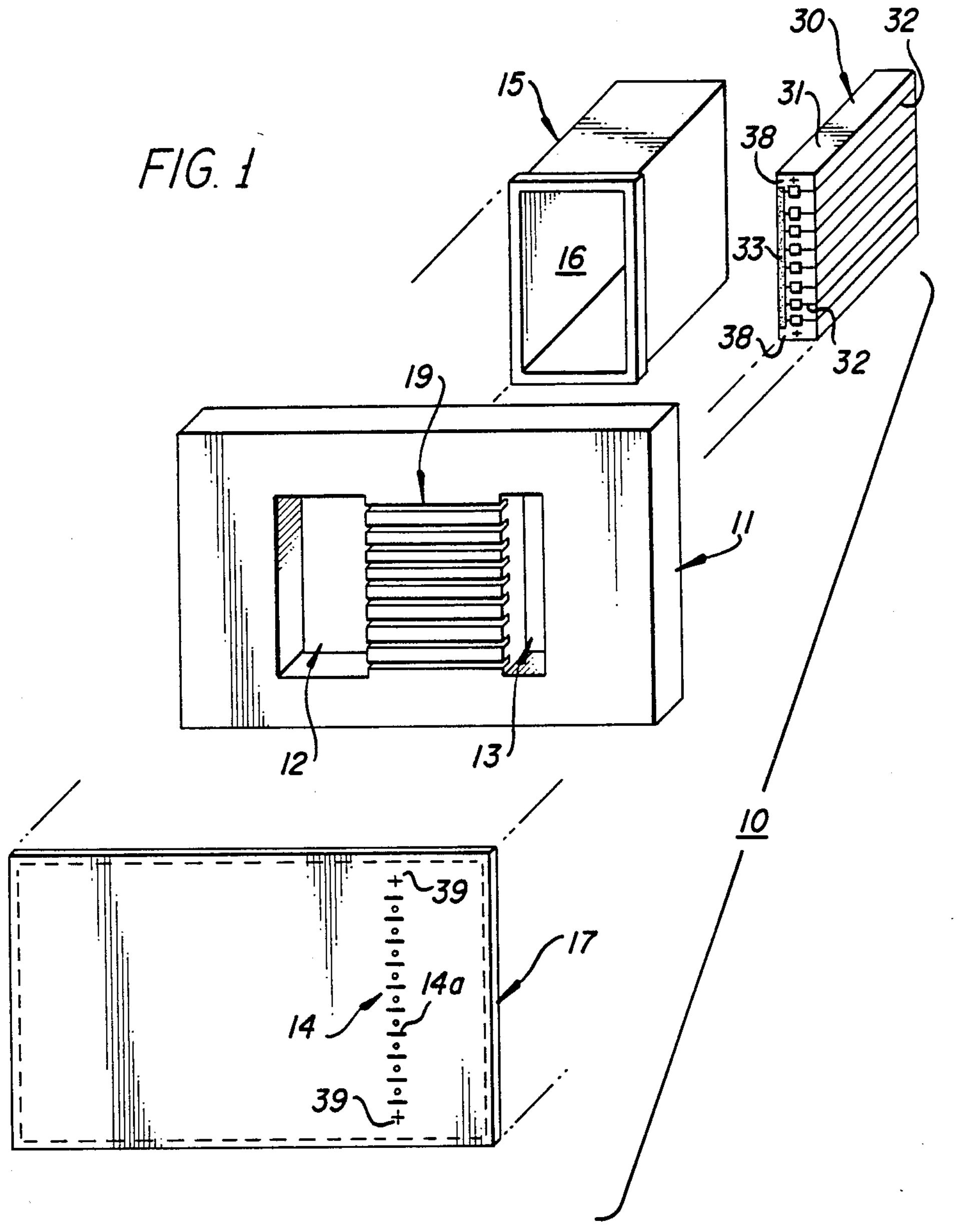
FIG. 1 is an exploded perspective view of a print/cartridge embodying one preferred print head construction in accord with the present invention.
Figure 2:
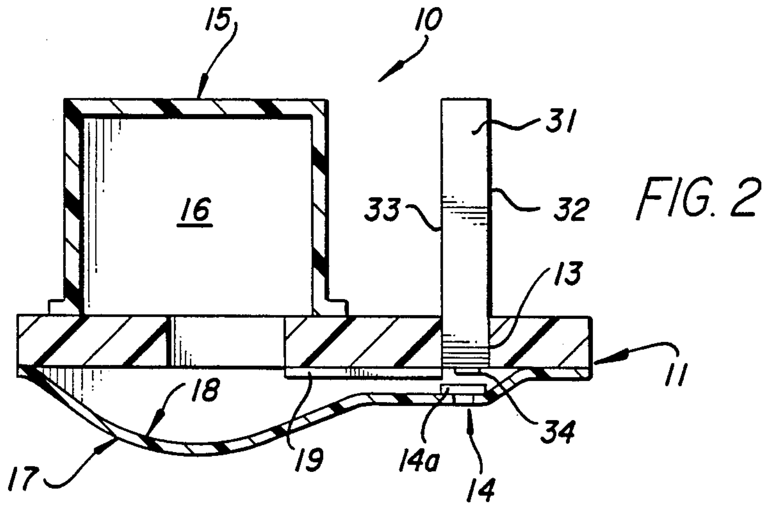
FIG. 2 is a cross sectional side view of the FIG. 1 print/cartridge in an assembled condition.
Figure 3:
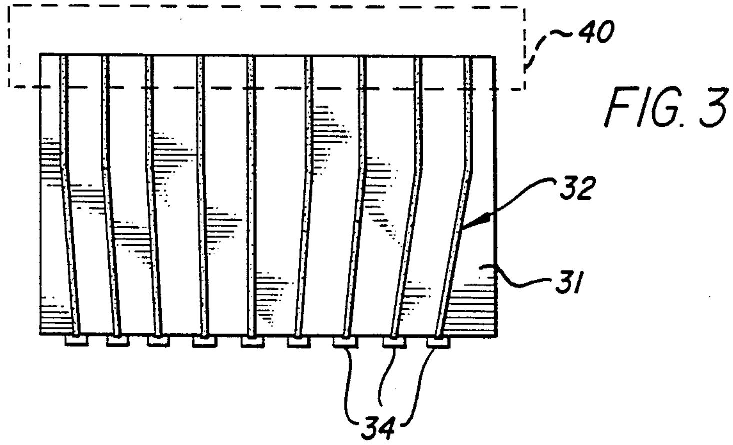
FIG. 3 is a plan view of one face surface of the heater/electrode component of the FIG. 1 print/cartridge assembly.
Figure 4:
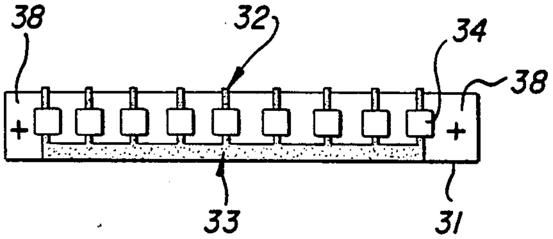
FIG. 4 is a top view showing the heater edge surface of the FIG. 3 component.

Referring to FIGS. 1 and 2, it can be seen that the print cartridge embodiment 10 of the present invention comprises a base member 11 which at one sector has an ink ingress opening 12 and another sector has a heater/electrode access slit 13. The base member 11 can be formed of molded plastic, e.g. epoxy, and therefore can include ink channeling structures 19 extending from the ingress opening 12 to the slit 13. The base member 11 can have a generally flat profile as shown in FIG. 1 and by virtue of its material composition (e.g. plastic) provides for easy attachment of other components that cooperate to form the print cartridge.

Thus, an ink supply housing 15, including top and side walls which define an ink supply reservoir 16, is attached by bonding or mechanically coupling its open periphery to the base member 11 so that ink in the reservoir can flow through ingress opening 12. Similarly, a cover member 17 is bonded to the opposite face of base member 11. One preferred construction for the cover member is as an electroformed structure (e.g., see U.S. Pat. No. 4,528,577) which integrally forms a manifold zone leading to ink channels 19 and thence to the drop ejection zone, which is aligned with the access slit 13 of the base member. As shown, the cover member 17 also has an array of ink droplet ejection orifices 14 (with intervening baffle elements 14*a*) formed therein in alignment with the access slit 13 (and the drop ejection zone). Alternatively, the cover member can be formed as a molded plastic part comprising the manifold and have a separate orifice plate attached to it at a location opposite slit 13 (see, e.g., U.S. Pat. No. 4,330,787).

In accord with the present invention a heater and electrode component 30 is mounted in slit 13 of the base member 11. In general that component can comprise a support portion 31, address and ground electrode portions 32, 33 and resistive heater portion 34. One preferred construction for component 30 is shown in more detail in FIGS. 3–5A, where it is formed as a photofabricated chip. Thus the support portion 31 is formed of ceramic glass and has address electrodes 32, a ground electrode(s) 33 and resistive heater elements 34 all formed thereon by metal deposition techniques, e.g. employing photofabrication and photoresists. After deposition of the resistive elements and electrodes, a protective layer, e.g. a silicon carbide, silicon nitride composite layer, can be deposited on the face surface of resistive elements 34. IF desired, a card edge connector 40 can be electrically coupled to leads 33 and 32 at the end of plate 31 opposite elements 34.

The heater/electrode 30 can be secured into slit 13, e.g., by epoxy bonding, with elements 34 approximately flush with the inner surface of base member 11. Cover member 17 also can be attached to base member 11 by epoxy bonding. It is desirable to provide visual alignment marks 38 at the ends of the heater and to index those marks with matching marks 39 at the ends of the orifice array 14 of the cover member so that individual orifices and heater elements can be accurately interpositioned.

Reflecting on the embodiment just described, it will be appreciated that the exposed region of the electrodes 32, 33 to ink is substantially eliminated and that the printer contacts to the electrodes can be made readily at a location spaced from the orifices. Thus the extensions of electrodes generally normally away from the print zone both facilitate electrode connections and minimizes need for electrode protection.

Figure 5A:
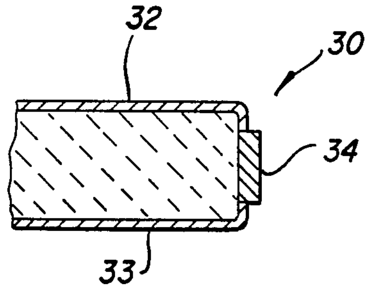
FIG. 5 is a side view of the FIG. 3 component.
FIGS. 5B and 5C are side views similar to FIG. 5A but showing alternative embodiments of heater/electrode components in accord with the present invention.
Figure 5B:
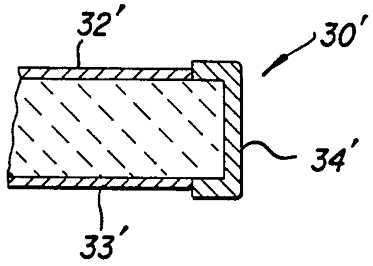
Figure 5C:
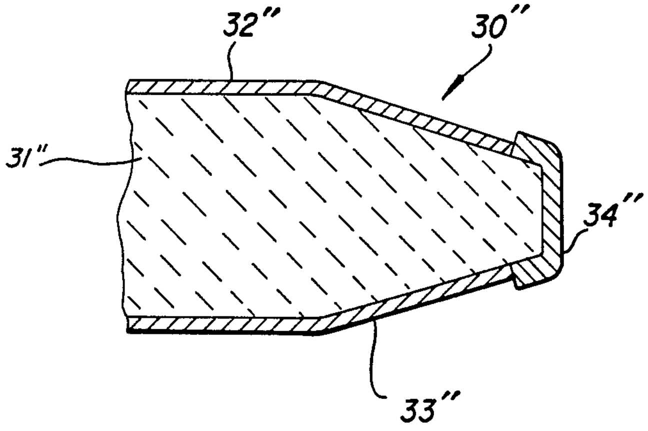

FIG. 5B shows an alternative embodiment of the electrode lead and heater configuration for component 30'. As illustrated, the heater portions 34' here extend over the entire end of component 30' to isolate the electrodes 32', 33' from any exposure to print cartridge ink. FIG. 5C shows a modification of the FIG. 5B approach wherein end edges of support portion 31'' are tapered to facilitate plating of electrodes 32'', 33'' and heater element 34''.

Figure 6A:
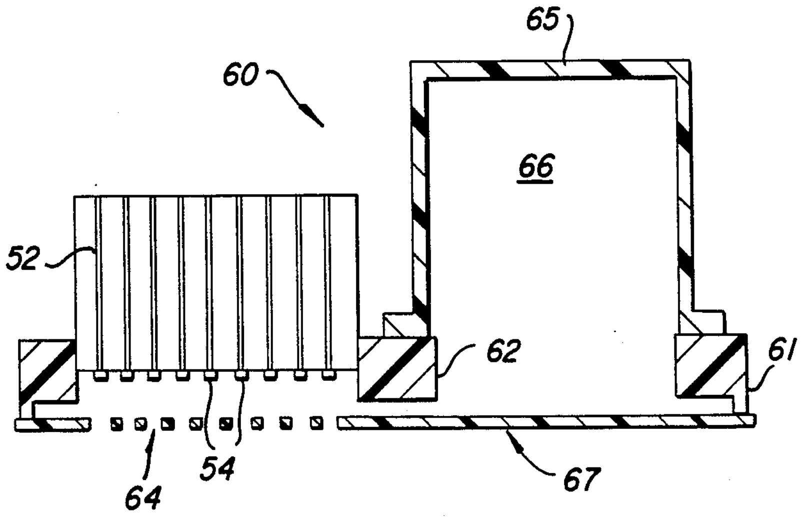
FIGS. 6A and 6B are cross-sectional views of another preferred print cartridge construction in accord with the present invention.
Figure 6B:
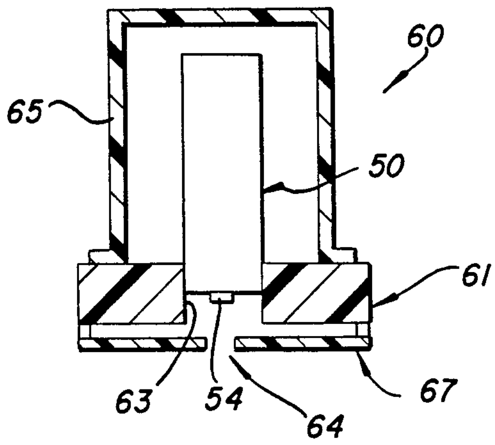

FIGS. 6A and 6B show an alternative embodiment of the invention wherein components are arranged to provide a print cartridge assembly 60 having lateral compactness. Thus, in this embodiment, a linear orifice array 64 is constructed in plate 67 with its array length along the direction of ink flow from the ink reservoir 66 to the drop ejection zone. As in the previously described embodiment, the chip 50 is constructed and mounted in an opening 63 of base member 61 so that the electrodes 52, 53 extend generally normally away From the plate 67, which defines the orifice array 64.

Figure 7B:
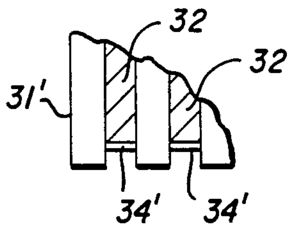
FIGS. 7A, 7B and 8 are cross sectional views of further alternative print cartridge constructions in accord with the present invention.
Figure 7A:
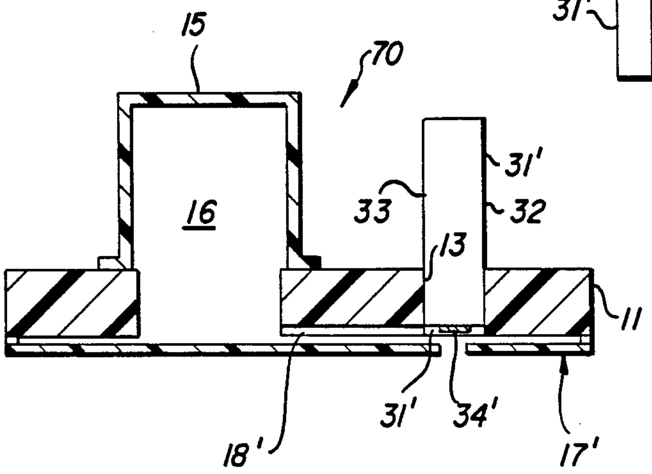

FIGS. 7A and 7B show another embodiment of the invention, very similar to the FIG. 2 embodiment and like portions are denoted with the same numerals as in FIG. 2. However, in the print cartridge 70 embodiment, the manifold zone 18' is formed by a molded cavity formed in base member 11 so that the orifice plate member 17' can be planar in its configuration. As shown best in FIG. 7B the heater elements 34' are formed in the floor of grooves of element 31' so that land portions therebetween provide hydraulic barriers between adjacent orifice zones. This construction can be effected by first milling grooves in end of plate 31' and then depositing the heater, electrode and protective layer portions.

Figure 8:
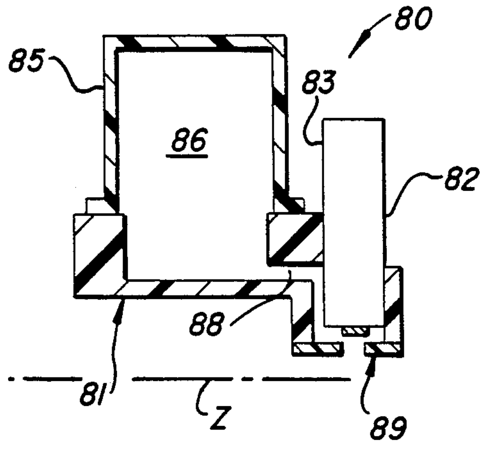

FIG. 8 shows another embodiment of the invention, print cartridge 80, wherein channel 88 is molded into base member 81 in a manner such that the orifice plate 89 is nearer the print zone Z than the bottom of the ink reservoir 86. Again the electrode portions 82, 83 extend normally away from the print zone to allows remote coupling without hindering the proximity of orifices to the print media.

The invention has been described in detail with particular reference to preferred embodiments thereof, but it will be understood that variations and modifications can be effected within the spirit and scope of the invention.

I claim:

1. A thermal drop-on-demand, ink jet printing assembly comprising:

(a) a plastic base member having molded therein an ink inlet aperture, a heater slit and a plurality of ink supply channel recesses between said inlet aperture and said slit;

(b) an electroformed cover member mounted on said base member, said cover member having a planar surface which covers said channel recesses to define ink passages from said inlet aperture to said heater slit and orifice means formed at a location over said heater slit; and (c) a heater/electrode chip including:

(i) a ceramic support having an edge surface formed with a series of land and groove portions and two side surfaces extending approximately normally away from said edge surface;

(ii) a plurality of planar resistor elements formed on the groove bottoms of said edge surface; and (iii) address and common electrode means respectively formed on said side surfaces and coupled to opposite edge portions of said resistor elements;

said heater/electrode chip being mounted in said slit of said base member so that said resistor elements are centered with respect orifices of said cover member, so that the land tops of said edge surface are intermediate respective orifices and so that said electrode means extend generally normally away from said array of orifice.

* * * * *